United States Patent [19]
Ross

[11] Patent Number: 5,932,098
[45] Date of Patent: Aug. 3, 1999

[54] FILTRATION APPARATUS FOR BREWING AND DRINKING COFFEE AND LIKE BEVERAGES AND CONCURRENTLY ENABLING A USER TO DRINK DIRECTLY FROM THE APPARATUS

[76] Inventor: Gary Ross, 167 Lambert St., Oxnard, Calif. 93030

[21] Appl. No.: 08/845,231

[22] Filed: Apr. 21, 1997

[51] Int. Cl.[6] .......... A47D 31/06; A47D 31/18; B01D 28/00
[52] U.S. Cl. ......... 210/337; 210/323.1; 210/335; 210/464; 210/467; 210/468; 210/473; 99/279; 99/319; 426/431; 426/433
[58] Field of Search .................. 426/433, 435, 426/431; 99/287, 279, 297, 299, 316, 317, 318, 319, 321; 210/350, 359, 464, 467, 468, 469, 473, 323.1, 324, 330, 335

[56] References Cited

U.S. PATENT DOCUMENTS

| | | |
|---|---|---|
| 454,879 | 6/1891 | Palmieri . |
| 607,409 | 7/1898 | Falardeau . |
| 1,346,485 | 7/1920 | Arrigunaga . |
| 2,053,021 | 9/1936 | Cassol . |
| 2,935,928 | 5/1960 | Keating et al. ............... 99/287 |
| 3,413,908 | 12/1968 | Nadelson .................. 99/297 |
| 3,657,993 | 4/1972 | Close ....................... 99/297 |
| 3,927,608 | 12/1975 | Doyel ...................... 99/297 |
| 4,381,696 | 5/1983 | Koral ....................... 99/304 |
| 4,650,583 | 3/1987 | Bondanini ............... 210/474 |
| 5,309,823 | 5/1994 | Allen ....................... 99/295 |
| 5,461,968 | 10/1995 | Portman .................. 99/287 |
| 5,478,586 | 12/1995 | Connor . |
| 5,635,233 | 6/1997 | Levinson ................. 99/297 |

Primary Examiner—David A. Reifsnyder
Attorney, Agent, or Firm—Thomas I. Rozsa; Tony D. Chen; Jerry Fong

[57] ABSTRACT

A filtration apparatus for brewing coffee, tea or the like therein and allowing a user to directly drink the brewed liquid from the same filtration apparatus. The apparatus comprises a vessel, such as a container or cup, and a double filter assembly installed within the vessel. The double filter assembly comprises a lower filter, an upper filter, and an alignment rod connecting the lower and upper filters together for facilitating the installation of the double filter assembly into the container. The lower and upper filters engage the interior periphery surface of the container for preventing the contents, such as ground coffee beans or tea leaves, in the container from being consumed by the user but allowing the brewed liquid to pass therethrough.

34 Claims, 3 Drawing Sheets

FILTRATION APPARATUS FOR BREWING AND DRINKING COFFEE AND LIKE BEVERAGES AND CONCURRENTLY ENABLING A USER TO DRINK DIRECTLY FROM THE APPARATUS

BACKGROUND OF THE INVENTION

1. Field of the Invention

The present invention generally relates to the field of drinking apparatus. More particularly, the present invention relates to the field of brewing apparatus for brewing ground coffee beans, tea or similar beverages.

2. Description of the Prior Art

Brewing apparatus, such as a French press, is well known in the prior art. The prior art french press are used for brewing ground coffee beans therein. A user pours hot water into the vessel, and after several minutes the coffee is ready to be consumed. The coffee is then transferred out from the french press and into a drinking cup for the user to drink the coffee. The disadvantage with this type of apparatus is that heat is lost from the transfer of the coffee, and thereby reduces the temperature of the coffee. In addition, the drinking cup has an open end which allows heat to escape, and thereby also reduces the temperature of the coffee.

It is desirable to have a very efficient and also very effective design and construction of a filtration apparatus for brewing ground coffee beans or similar beverages therein and after the brewing is completed, the coffee is directly consumed from the filtration apparatus, thereby eliminating the need to transfer the coffee to a drinking cup and keeping the coffee at around its original temperature for a period of time. It is also desirable to provide a filtration apparatus to prevent splashing of the liquid and keep the heat in the apparatus.

SUMMARY OF THE INVENTION

The present invention is a filtration apparatus for brewing coffee, tea or similar beverages which enables a user to drink the liquid from the same filtration apparatus. The filtration apparatus comprises a vessel, such as a container or cup, and a double filter assembly installed within the vessel. The double filter assembly comprises a lower filter means, an upper filter means, and an alignment rod connecting the lower and upper filter means together for facilitating the installation of the double filter assembly into the container. The lower filter means engages the interior periphery surface of the container and is located adjacent to the lowermost portion of the container for preventing the contents, such as ground coffee beans or tea leaves, in the container from being consumed by the user but allowing the liquid to pass therethrough. The upper filter means engages the interior periphery surface of the container and is located adjacent to the uppermost portion of the container for further preventing the contents, such as ground coffee beans or tea leaves, in the container from being consumed by the user but allowing the liquid to pass therethrough. When the brewing of the contents is completed, the liquid can be consumed by the user using the same container, where the liquid passes through the lower and upper filter means but the contents is retained in the container.

It is therefore an object of the present invention to provide a filtration apparatus for brewing contents, such as ground coffee beans or tea leaves, therein and after brewing is completed, the liquid is then consumed by using the filtration apparatus as a drinking cup, thereby eliminating the need to transfer the hot liquid to a different drinking cup and keeping the hot liquid at around its original temperature for a period of time.

It is also an object of the present invention to provide a filtration apparatus which includes a lower filter means for preventing a user from consuming the contents therein but allowing the hot liquid to pass therethrough, and an upper filter means for further preventing the user from consuming the contents therein but also allowing the hot liquid to pass therethrough, thereby providing a double protection from consuming the contents.

It is an additional object of the present invention to provide a filtration apparatus which includes an upper filter means which can be used as a shielding device to prevent splashing of the liquid and also keeping the heat within the apparatus.

It is a further object of the present invention to provide a filtration apparatus which is of simple design and which will enable the liquid in the apparatus, such as hot coffee, to approximately retain its temperature for a period of time.

In the preferred embodiment of the present invention, the filtration apparatus includes a lower filter unit, an upper filter unit, and an alignment rod connecting the lower and upper filter u nits together for maintaining the alignment of the two filter units within the apparatus.

In an alternative embodiment of the present invention, the filtration apparatus includes a lower filter unit, an upper scaling lid, and an attachment rod for connecting the lower filter unit with the upper sealing lid.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figures 1, 2:
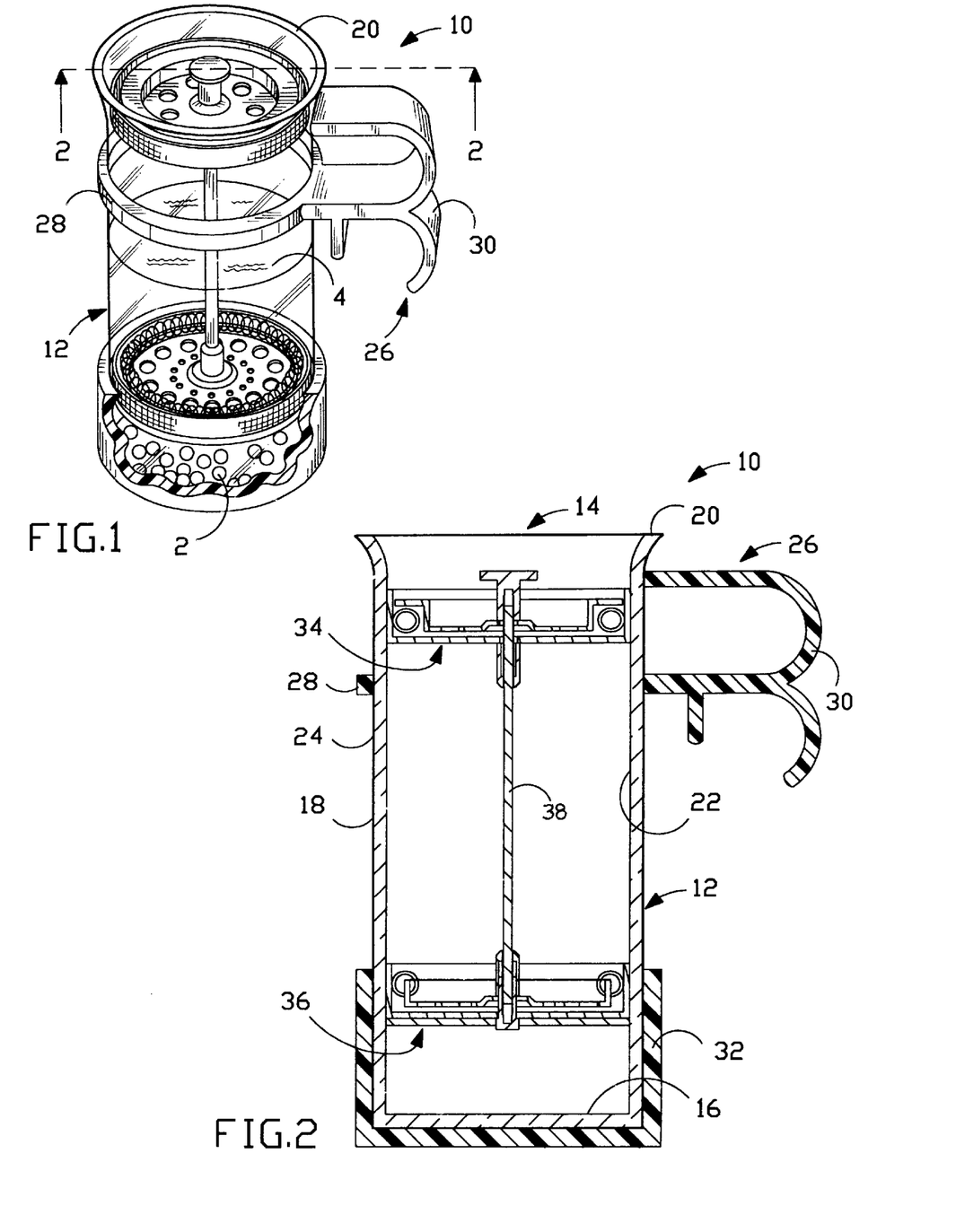
FIG. 1 is a partial cutout perspective view of a preferred embodiment of the present invention filtration apparatus.
FIG. 2 is an enlarged cross-sectional view taken along line 2—2 of FIG. 1.

Referring to FIGS. 1 and 2, there are illustrated a perspective view and a cross-sectional view of a preferred embodiment of the present invention filtration apparatus 10 for brewing contents 2, such as ground coffee beans, tea leaves, etc., therein when hot water 4 is added into the filtration apparatus and enabling a user to consume the hot liquid mixture from the same apparatus. The filtration apparatus 10 comprises a generally cylindrical shaped hollow vessel 12 which by way of example may be a cup or container, and a double filter assembly 14. The cylindrical vessel 12 has a flat base portion 16 and a circumferential sidewall 18 extending upwardly from the base portion 16 and ending at its upper end to form a slightly outward curved upper rim 20. The circumferential sidewall 18 has an interior surface 22 and an exterior surface 24.

A handle member 26 is also provided with the present invention filtration apparatus 10 to allow a user to hold the vessel 12 for drinking the hot liquid mixture 4. The handle member 26 has a handle portion 30 and an annular ring 28 integrally formed with the handle portion 30. The annular ring 28 has a slightly smaller inner diameter than that of the outer diameter of vessel 12 for press-fitting over the outer diameter of vessel 12, such that the interior of the annular ring 28 abuts against the exterior surface 24 of the circumferential sidewall 18 of vessel 12.

The filtration apparatus 10 further comprises a generally circular shaped bottom cover 32 for covering the base portion 16 and part of the circumferential sidewall 18 of vessel 12 to protect exterior surfaces of furnitures, such as coffee tables, dressers, etc., from damage when the vessel 12 containing hot liquid is placed thereon. By way of example, the handle member 26 and bottom cover 32 can be made from plastic material or any other suitable material. The vessel 12 may be manufactured out of glass or ceramic material and the height of the vessel can vary. The manufacturing process which could accommodate the construction of the handle member and bottom cover may be injection, thermoform, etc. or other molding process.

Figure 3:
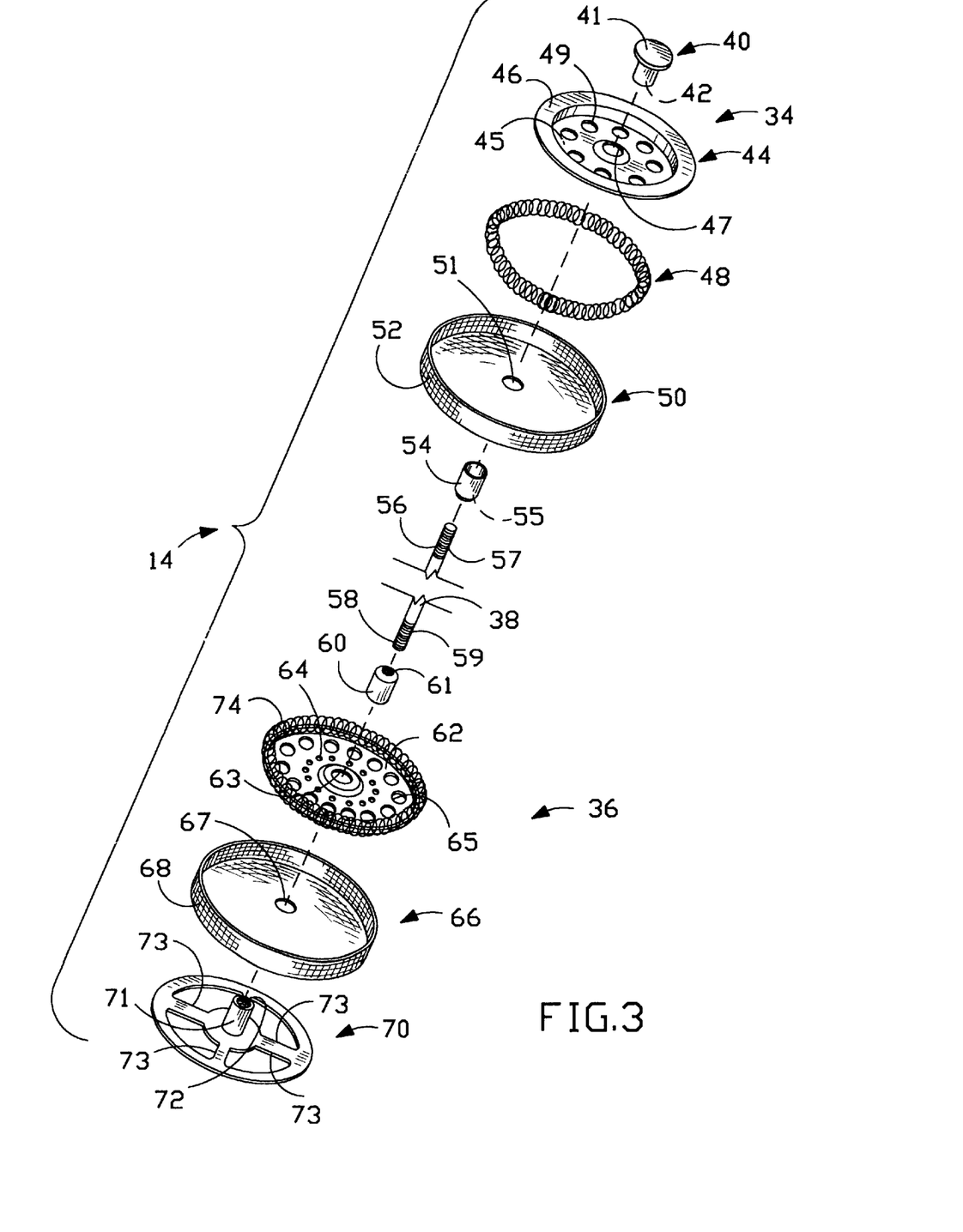
FIG. 3 is an exploded view of a double filter assembly of the present invention filtration apparatus shown in FIG. 1.

FIG. 3 illustrates an exploded view of the double filter assembly 14 of the present invention filtration apparatus. Referring to FIGS. 2 and 3, the double filter assembly 14 is preferably made of stainless steel material and includes an upper filter unit 34 and a lower filter unit 36, and an elongated vertical alignment rod 38 connecting the upper and lower filter units 34 and 36 in a spaced apart relationship. The vertical rod 38 has an upper portion 56 with outer screw threads 57 and a lower portion 58 also with outer screw threads 59. The outer screw threads 57 and 59 extend partially along the length of the vertical rod 38.

The upper filter unit 34 comprises a screw nut 40, an upper retaining plate 44, an upper flexible fine-mesh screen 50, an upper circular shaped compressible and expandable coil spring 48 sandwiched between the retaining plate 44 and mesh screen 50, and an upper cylindrical locking sleeve 54. The screw nut 40 has a knob head 41 for allowing a user to turn the screw nut 40, and inner screw threads 42. The retaining plate 44 has a depressed top surface 45, an upper circumferential rim 46 surrounding the depressed surface 45, a central aperture 47, and multiple small apertures 49 located on the periphery of the depressed surface 45 and surrounding the central aperture 47. The flexible mesh screen 50 has a central aperture 51 and a circumferential sidewall 52 extending upwardly. The upper cylindrical sleeve 54 has inner screw threads 55 extending partially along the lower part of the sleeve. The outer screw threads 57 at the upper portion 56 of the vertical rod 38 are threadedly engaged with the inner screw threads 55 of the sleeve 54 such that the upper sleeve 54 abuts against the bottom of the mesh screen 50 and the outer screw threads 57 of the vertical rod 38 are further threaded to the inner screw threads 42 of the screw nut 40, where the retaining plate 44, the coil spring 48 and the mesh screen 50 are tightly held between the screw nut 40 and the upper cylindrical locking sleeve 54 as shown in FIG. 2.

The lower filter unit 36 comprises a lower cylindrical locking sleeve 60, a lower retaining plate 62, a bottom support plate 70, a lower flexible fine-mesh screen 66 sandwiched between the retaining plate 62 and the support plate 70. The lower filter unit 36 further comprises a lower circular shaped compressible and expandable coil spring 74 wrapped around and surrounding the outer periphery of the retaining plate 62. The lower cylindrical sleeve 60 has inner screw threads 61 extending partially along the upper part of the sleeve. The retaining plate 62 has a central aperture 63, a first group of apertures 64 surrounding the central aperture 63, and a second group of apertures 65 surrounding the first group of apertures 64 and the central aperture 63, all for allowing the liquid mixture to pass through retaining plate 62. The first group of apertures 64 are slightly smaller than the second group of apertures 65. The flexible mesh screen 66 has a central aperture 67 and an outer periphery sidewall 68 extending upwardly. The bottom support plate 70 has a central upwardly protruding hub or socket 71 with inner screw threads 72 and four spaced apart open sections 73 for allowing the liquid mixture to pass therethrough. The upwardly protruding hub 71 of the bottom support plate 70 is inserted through the respective central apertures 67 and 63 of the flexible mesh screen 66 and the retaining plate 62 respectively such that it slightly extends above the coil spring 74. The outer screw threads 59 at the lower portion 58 of the vertical rod 38 are threadedly engaged with the inner screw threads 61 of the sleeve 60. The outer screw threads 59 of the vertical rod 38 are further threaded with the inner screw threads 72 of the protruding hub 71, such that the retaining plate 62 and the mesh screen 66 are tightly held between the lower cylindrical sleeve 60 and the bottom support plate 70 as shown in FIG. 2.

Referring again to FIGS. 2 and 3, the double filter assembly 14 is installed into the cylindrical shaped vessel 12 such that the lower filter unit 36 is located adjacent to the lowermost portion of the cylindrical shaped vessel 12 while the upper filter unit 34 is located adjacent to the uppermost portion of the cylindrical shaped vessel 12. The respective outer periphery sidewalls 52 and 68 of the mesh screens 50 and 66 are respectively engaged with the interior surface 22 of the circumferential sidewall 18 of the cylindrical shaped vessel 12, where the coil springs 48 and 74 expand against the respective outer periphery sidewalls 52 and 68 of the mesh screens 50 and 66 so that these mesh screens are tightly engaged with the interior surface 22 of the circumferential sidewall 18 of vessel 12 for preventing contents from escaping between the mesh screens 50 and 66 and the interior sidewalls 18 of the vessel.

Referring again to FIGS. 1 and 2, to use the present invention filtration apparatus 10, a user places the vessel 12 on a stable, non-slippery surface (not shown). The double filter assembly 14 is first taken out from the cylindrical shaped vessel 12. A measure of ground coffee beans or the like is put into the vessel 12. A small amount of fresh boiled water is then poured into the vessel 12. The ground coffee beans are allowed to seep one to two minutes before the user pours the rest of the hot water into the vessel. The water can be stirred with a spoon or the like. The user then places the double filter assembly 14 into the vessel 12 and presses it downward, so that the user can simply drink the hot coffee directly from the vessel 12 without removing the double filter assembly 14, where the lower filter unit 36 prevents a user from consuming the ground coffee beans and the upper filter unit 34 further prevents the user from consuming the ground coffee beans or other particulates. The user can comfortably sip the hot liquid from the vessel 12 through the curved upper rim 20 by placing his/her upper lip thereto.

All of the parts of the present invention filtration apparatus 10 are machine washable.

Figures 4, 5:
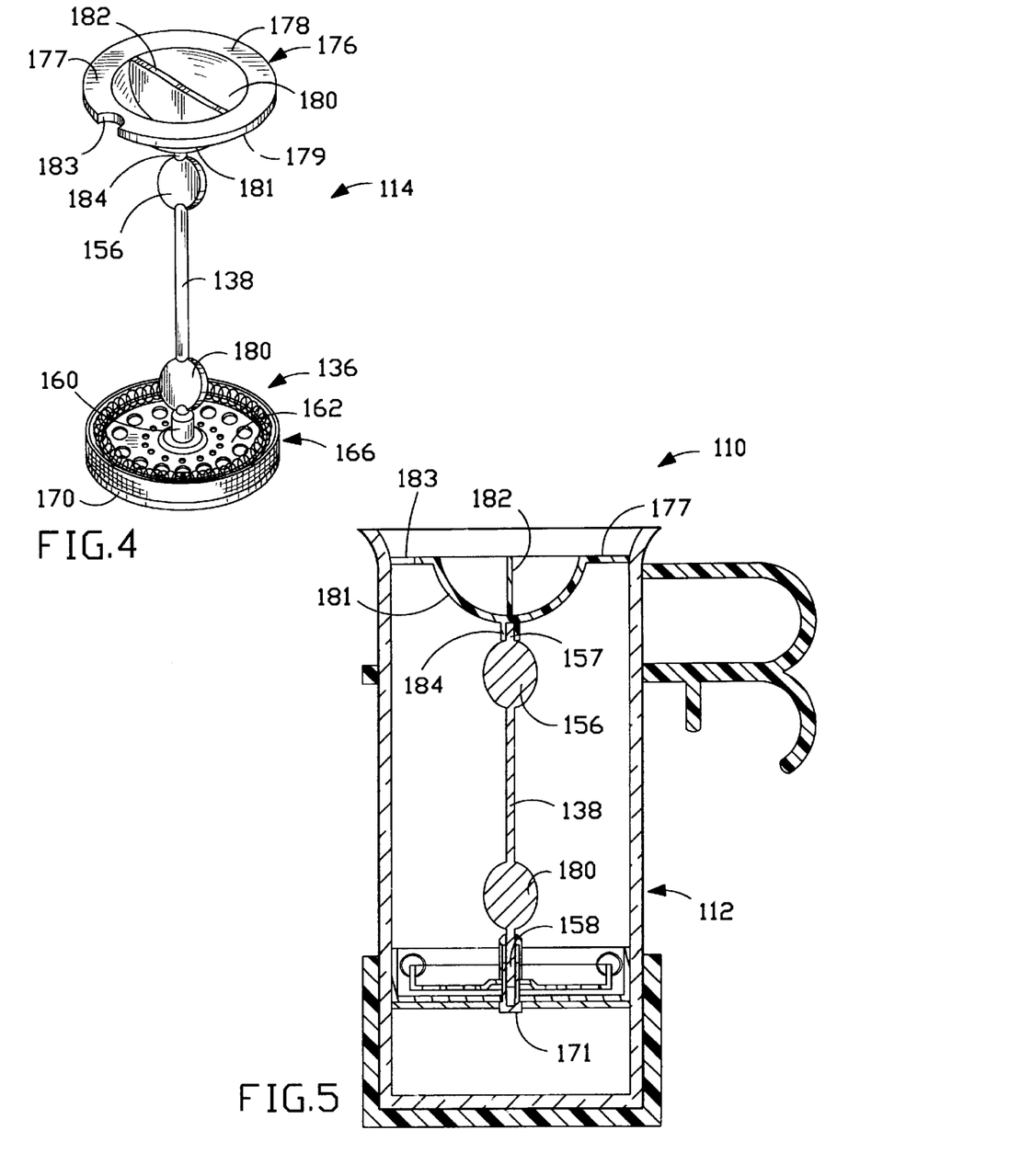
FIG. 4 is a perspective view of an alternative embodiment of a filter assembly of the present invention filtration apparatus.
FIG. 5 is an enlarged cross-sectional view of the present invention filtration apparatus, showing the alternative embodiment of the filter assembly shown in FIG. 4.

Referring to FIGS. 4 and 5, there is illustrated an alternative embodiment of the present invention filtration apparatus 10 for brewing contents therein. In this embodiment, the generally cylindrical shaped vessel 112 is identical to the cylindrical shaped vessel 12 illustrated in FIGS. 1 and 2, and the description thereof will not be repeated. The parts are numbered correspondingly with 100 added to each number. In addition, the filter assembly 114 is similar to the double filter assembly 14 shown in FIGS. 1 through 3, except the upper filter unit 34 of the double filter assembly 14 is substituted with a generally circular shaped upper sealing member or lid 176. The filter assembly 114 comprises a lower filter unit 136, an upper sealing lid 176, and a vertical alignment rod 138 connecting the lower filter unit 136 to the upper sealing member 176. The lower filter unit 136 is identical to the lower filter unit 36 shown in FIGS. 1 through 3, and the description thereof will not be repeated. The vertical alignment rod 138 has an upper spoon shaped portion 156 with a rounded top end 157, a lower spoon shaped portion 180, a further lower portion 158 with a lower end and outer screw threads, where the outer screw threads of the further lower portion 158 are threadedly engaged with the inner screw threads of the protruding hub 171, such that the retaining plate 162 and the mesh screen 166 are tightly held between the lower cylindrical sleeve 160 and the bottom support plate 170 and the lower spoon shaped portion 180 is located adjacent the protruding hub 171 of the bottom support plate 170.

The sealing member 176 is comprised of a circumferential disk 177 having a top surface 178 and a bottom surface 179. Disk 177 surrounds an interior well 180 which extends into a generally hemispherical body portion 181. A vertical piece 182 extends into and crosses the well 180 and terminates at diametrically opposite interior ends of the disk 177 and functions as a handle. Therefore, a user can grip the lid 176 by placing his or her fingers into the well 180 and grip the handle 182 with opposed fingers. The lid 176 is further comprised of a drinking gap 183 at its disk 177, and a protruding hub 184 extending from the hemispherical body portion 181, where the top end 157 of the vertical alignment rod 138 is press-fitted within the protruding hub 184.

It will be appreciated that the press-fitted engagement between the protruding hub 184 and the top end 157 of the vertical alignment rod 138 is but one of many ways of attaching the two together. It is emphasized that while the press-fitted engagement is the preferred attachment, it is also within the spirit and scope of the present invention to utilize a permanent attachment, such as welding or any other suitable means, known to one skilled in the art.

The filter assembly 114 is installed into the vessel 112 such that the lower filter unit 136 is located adjacent to the lowermost portion of the vessel 112 while the sealing lid 176 is located adjacent to the uppermost portion of the vessel 112. The sealing lid 176 fits perfectly within the cylindrical shaped vessel 112 to maximize the seal to prevent heat loss and restrict flow of the liquid in the event of a knockdown. Liquid is therefore securely retained within the vessel 112. The user drinks the liquid through the gap 183 on disk 177.

Since this is only a small opening, the temperature of the liquid within is still maintained at close to its original temperature. The operation of the unit is the same as the first embodiment. While the present invention has been described for use with ground coffee beans, other contents such as tea leaves can also be used in the same manner as described for coffee.

Defined in detail, the present invention is a filtration apparatus for brewing contents therein when hot water is added into the apparatus and allowing a user to directly drink a liquid brewed from the contents, the apparatus comprising: (a) a generally cylindrical shaped vessel having a bottom, an upwardly extending circumferential sidewall and an upper rim at the top of its circumferential sidewall, the circumferential sidewall having an interior surface and an exterior surface; (b) a handle member affixed to the exterior surface of the circumferential sidewall of the cylindrical shaped vessel; (c) a double filter assembly including a lower filter unit, an upper filter unit, and an elongated vertical alignment rod connecting the lower and upper filter units in a spaced apart relationship; (d) the lower filter unit having a bottom support plate, a lower retaining plate, a lower flexible mesh screen sandwiched between the support and retaining plates, and a circular shaped coil spring wrapped around the outer periphery of the retaining plate, the support plate having a central upwardly protruding hub with inner threads, the support plate also having at least one open section for allowing the brewed liquid to pass through, the retaining plate having a central aperture and a plurality of small apertures surrounding the central aperture for allowing the brewed liquid to pass through, the flexible mesh screen having a central aperture and an outer periphery sidewall extending upwardly, the upwardly protruding hub inserted through the central apertures of the flexible mesh screen and the retaining plate; (e) the upper filter unit having an upper flexible mesh screen, an upper retaining plate, and a circular shaped coil spring sandwiched between the mesh screen and the retaining plate, the flexible mesh screen having a central aperture and an outer periphery sidewall extending upwardly, the retaining plate having a central aperture and a plurality of small opening surrounding the central aperture; (i) the vertical alignment rod having an upper portion with an upper end and outer screw threads, and a lower portion with a lower end and outer screw threads; (g) a lower cylindrical sleeve having inner screw threads threadedly engaged with the outer screw threads on the lower portion of the vertical alignment rod; (h) an upper cylindrical sleeve having inner screw threads threadedly engaged with the outer screw threads on the upper portion of the vertical alignment rod; (i) the lower end of the vertical rod inserted into the central protruding hub of the support plate of the lower filter unit such that the outer screw threads thereof are further threadedly engaged with the inner screw threads of the protruding hub of the lower support plate, where the lower cylindrical sleeve abuts against the retaining plate of the lower filter unit for securing the retaining plate and the mesh screen to the support plate of the lower filter unit; (j) the upper end of the vertical rod inserted through the central apertures of the flexible mesh screen and the retaining plate of the upper filter unit such that the upper cylindrical sleeve abuts against the lower surface of the mesh screen; (k) an upper retaining screw nut having inner screw threads threadedly engaged with the outer screw threads on the upper portion of the vertical rod for retaining together the retaining plate, the coil spring and the mesh screen of the upper filter unit; and (l) the double filter assembly inserted into the cylindrical shaped vessel such that the lower filter unit is located adjacent to the lowermost portion of the cylindrical shaped vessel and the upper filter unit is located adjacent to the uppermost portion of the cylindrical shaped vessel, where the outer periphery sidewalls of the mesh screens of the lower and upper filter units engage with the interior surface of the circumferential sidewall of the cylindrical shaped vessel and the coil springs expand against the outer periphery sidewalls of the mesh screens to engage the interior surface of the sidewall of the cylindrical shaped vessel for preventing the contents from escaping therebetween; (m) whereby the contents is brewed within the vessel and the lower and upper filter units provide double protection to prevent the contents from being consumed by the user.

Defined broadly, the present invention is a filtration apparatus for brewing contents therein when hot water is added into the apparatus and allowing a user to directly drink a liquid brewed from the contents, the apparatus comprising: (a) a vessel having a bottom, an upwardly extending sidewall and an upper rim at the top of its sidewall, the sidewall having an interior surface and an exterior surface; (b) a lower filter unit having a bottom plate, a top plate, a mesh screen sandwiched between the top and bottom plates, and a compressible and expandable spring wrapped around the outer periphery of the top plate, the bottom plate having a hub and means for allowing the liquid mixture to pass therethrough, the retaining plate having an aperture and means for allowing the brewed liquid to pass therethrough, the mesh screen having an aperture and a periphery sidewall, the hub inserted through the apertures of the mesh screen and the top plate; (c) an upper filter unit having a mesh screen, a retaining plate, and a compressible and expandable spring sandwiched between the mesh screen and the retaining plate, the mesh screen having an aperture and a periphery sidewall, the retaining plate having an aperture and means for allowing the brewed liquid to pass therethrough; (d) an alignment rod having a lower retaining sleeve with a lower end and an upper retaining sleeve with an upper end, where the lower end is press-fitted into the hub of the bottom plate of the lower filter unit and the lower retaining sleeve abuts against the top plate of the lower filter unit for securing the top plate and the mesh screen to the bottom plate of the lower filter unit, and the upper end inserted through the apertures of the mesh screen and the retaining plate of the upper filter unit and retained thereto by a nut means such that the upper retaining sleeve abuts against the mesh screen of the upper filter unit and the nut means abuts against the retaining plate of the upper filter unit; and (e) the lower and upper filter units inserted into the vessel and respectively located adjacent to the lowermost and uppermost portions of the vessel, where the periphery sidewalls of the mesh screens of the lower and upper filter units engage with the interior surface of the sidewall of the vessel and the compressible and expandable springs expand against the periphery sidewalls of the mesh screens to engage with the interior surface of the sidewall of the vessel for preventing the contents from escaping therebetween; (f) whereby the contents is brewed within the vessel and the lower and upper filter units provide double protection to prevent the contents from being consumed by the user.

Defined more broadly, the present invention is a double filter assembly to be used in conjunction with a container having an interior circumference for brewing contents therein when hot water is added into the container and allowing a user to directly drink a liquid brewed from the same container, the double filter assembly comprising: (a) a first filter means expanding against the interior circumference of the container and located adjacent to the lowermost portion of the container for preventing the contents in the container from being consumed by the user but allowing the liquid mixture to pass therethrough; (b) a second filter means expanding against the interior circumference of the container and located remote from the first filter means and adjacent to the uppermost portion of the container for further preventing the contents from being consumed by the user but allowing the liquid mixture to pass therethrough; and (c) means for maintaining the alignment and spaced apart relationship of the first and second filter means in the container; (d) whereby when brewing of the contents is completed, the brewed liquid can be consumed by the user using the same container, where the liquid mixture passes through the first and second filter means but the contents are retained in the container.

Defined alternatively in detail, the present invention is a filtration apparatus for brewing contents therein when hot water is added into the apparatus and allowing a user to directly drink a liquid brewed therefrom, the apparatus comprising: (a) a generally cylindrical shaped vessel having a bottom, an upwardly extending circumferential sidewall and an upper rim at the top of its circumferential sidewall, the circumferential sidewall having an interior surface and an exterior surface; (b) a handle member affixed to the exterior surface of the circumferential sidewall of the cylindrical shaped vessel; (c) a lower filter unit having a support plate, a retaining plate, a flexible mesh screen sandwiched between the support and retaining plates, and a circular shaped coil spring wrapped around the outer periphery of the retaining plate, the support plate having a central upwardly protruding hub with inner threads, the support plate also having at least one open section for allowing the brewed liquid to pass through, the retaining plate having a central aperture and a plurality of small apertures surrounding the central aperture for allowing the brewed liquid to pass through, the flexible mesh screen having a central aperture and an outer periphery sidewall extending upwardly, the upwardly protruding hub inserted through the central apertures of the flexible mesh screen and the retaining plate; (d) a lid having a hemispherical body portion and a circumferential disk surrounding the hemispherical body portion, the circumferential disk having at least one gap, the hemispherical body portion having a recessed top surface forming a well, a bottom surface and a protruding hub integrally connected to the bottom surface, the lid also having a handle disposed within the well for lifting the lid; (e) an elongated vertical alignment rod having an upper portion with an upper end, and a lower portion with a lower end and outer screw threads; (f) a lower cylindrical sleeve having inner screw threads threadedly engaging the outer screw threads on the lower portion of the vertical alignment rod; (g) the lower end of the vertical alignment rod inserted into the central protruding hub of the support plate of the lower filter unit such that the outer screw threads thereof are further threadedly engaged with the inner screw threads of the protruding hub, where the lower cylindrical sleeve abuts against the retaining plate of the lower filter unit for securing the retaining plate and the mesh screen to the support plate; (h) the upper end of the vertical alignment rod press-fitted within the protruding hub of the hemispherical portion of the lid; and (i) the lower filter unit and the lid inserted into the cylindrical shaped vessel and respectively located adjacent to the lowermost and uppermost portions of the cylindrical shaped vessel, where the outer periphery sidewall of the mesh screen of the lower filter unit engages with the interior surface of the circumferential sidewall of the cylindrical shaped vessel and the coil spring expands against the outer periphery sidewall of the mesh screen to engage with the interior surface of the sidewall of the cylindrical shaped vessel, and the lid abuts against the interior surface of the sidewall of the vessel; (j) whereby the contents is brewed within the vessel, the lower filter unit prevents the contents from being consumed by the user, and the lid prevents the brewed liquid from splashing while allowing the user to drink the liquid mixture through the at least one gap on the disk of the lid.

Defined alternatively broadly, the present invention is a filtration apparatus for brewing contents therein when hot water is added into the apparatus and allowing a user to directly drink a brewed liquid therefrom, the apparatus comprising: (a) a vessel having a bottom, an upwardly extending sidewall, and an upper rim at the top of its sidewall, the sidewall having an interior surface and an exterior surface; (b) a filter unit having a bottom plate, a top plate, a mesh screen sandwiched between the top and bottom plates, and a compressible and expandable spring wrapped around the outer periphery of the top plate, the bottom plate having a hub and means for allowing the brewed liquid to pass therethrough, the top plate having an aperture and means for allowing the brewed liquid to pass therethrough, the mesh screen having an aperture and a periphery sidewall, the hub inserted through the apertures of the mesh screen and the top plate; (c) a lid having a body portion and a disk surrounding the body portion, the disk having at least one gap, the body portion having a recessed top surface forming a well, a bottom surface and a protruding hub connected to the bottom surface; (d) an alignment rod having an upper portion with an upper end and a lower portion with a lower end, where the lower end is press-fitted into the hub of the bottom plate of the filter unit, and the upper end press-fitted into the protruding hub of the lid; and (e) the filter unit and the lid respectively located adjacent to the lowermost and uppermost portions of the vessel, where the periphery sidewall of the mesh screen engages with the interior surface of the sidewall of the vessel and the compressible and expandable spring expands against the periphery sidewall of the mesh screen to engage with the interior surface of the sidewall of the vessel, and the disk of the lid abuts against the interior surface of the sidewall of the vessel; (f) whereby the contents is brewed within the vessel, the filter unit prevents the contents from being consumed by the user, and the lid prevents the brewed liquid from splashing while allowing the user to drink the brewed liquid through the at least one gap on the disk of the lid.

Defined alternatively more broadly, the present invention is a filter assembly to be used in conjunction with a container for brewing contents therein when hot water is added into the container, and allowing a user to directly drink a brewed liquid from the same container, the filter assembly comprising: (a) a filter means expanding against the interior circumference of the container for preventing the contents in the container from being consumed by the user but allowing the brewed liquid to pass therethrough; (b) a lid covering the interior of the container and located remote from the filter means for preventing the brewed liquid from splashing while allowing the user to drink the brewed liquid through means in the lid; and (c) means for maintaining the alignment and spaced apart relationship of the filter means and the lid in the container; (d) whereby when brewing of the contents is completed, the brewed liquid can be consumed by the user using the same container, where the brewed liquid passes through the filter means but the contents are retained in the container.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A filtration apparatus for brewing contents therein when hot water is added into the apparatus and allowing a user to directly drink a brewed liquid from the contents, the apparatus comprising:
    a. a generally cylindrical shaped vessel having a bottom, an upwardly extending circumferential sidewall and an upper rim at the top of its circumferential sidewall, the circumferential sidewall having an interior surface and an exterior surface;
    b. a handle member affixed to said exterior surface of said circumferential sidewall of said cylindrical shaped vessel;
    c. a double filter assembly including a lower filter unit, an upper filter unit, and an elongated vertical alignment rod connecting the lower and upper filter units in a spaced apart relationship;
    d. said lower filter unit having a bottom support plate, a lower retaining plate, a lower flexible mesh screen sandwiched between the support and retaining plates, and a circular shaped coil spring wrapped around the outer periphery of the retaining plate, the support plate having a central upwardly protruding hub with inner threads, the support plate also having at least one open section for allowing the brewed liquid to pass through, the retaining plate having a central aperture and a plurality of small apertures surrounding the central aperture for allowing the brewed liquid to pass through, the flexible mesh screen having a central aperture and an outer periphery sidewall extending upwardly, the upwardly protruding hub inserted through the central apertures of the flexible mesh screen and the retaining plate;
    e. said upper filter unit having an upper flexible mesh screen, an upper retaining plate, and a circular shaped coil spring sandwiched between the mesh screen and the retaining plate, the flexible mesh screen having a central aperture and an outer periphery sidewall extending upwardly, the retaining plate having a central aperture and a plurality of small opening surrounding the central aperture;
    f. said vertical alignment rod having an upper portion with an upper end and outer screw threads, and a lower portion with a lower end and outer screw threads;
    g. a lower cylindrical sleeve having inner screw threads threadedly engaged with said outer screw threads on said lower portion of said vertical alignment rod;
    h. an upper cylindrical sleeve having inner screw threads threadedly engaged with said outer screw threads on said upper portion of said vertical alignment rod;

i. said lower end of said vertical rod inserted into said central protruding hub of said support plate of said lower filter unit such that said outer screw threads thereof are further threadedly engaged with said inner screw threads of said protruding hub of said lower support plate, where said lower cylindrical sleeve abuts against said retaining plate of said lower filter unit for securing said retaining plate and said mesh screen to said support plate of said lower filter unit;

j. said upper end of said vertical rod inserted through said central apertures of said flexible mesh screen and said retaining plate of said upper filter unit such that said upper cylindrical sleeve abuts against the lower surface of said mesh screen;

k. an upper retaining screw nut having inner screw threads threadedly engaged with said outer screw threads on said upper portion of said vertical rod for retaining together said retaining plate, said coil spring and said mesh screen of said upper filter unit; and l. said double filter assembly inserted into said cylindrical shaped vessel such that said lower filter unit is located adjacent to the lowermost portion of said cylindrical shaped vessel and said upper filter unit is located adjacent to the uppermost portion of said cylindrical shaped vessel, where said outer periphery sidewalls of said mesh screens of said lower and upper filter units engage with said interior surface of said circumferential sidewall of said cylindrical shaped vessel and said coil springs expand against said outer periphery sidewalls of said mesh screens to engage said interior surface of said sidewall of said cylindrical shaped vessel for preventing said contents from escaping therebetween;

m. whereby said contents is brewed within said vessel and said lower and upper filter units provide double protection to prevent said contents from being consumed by said user.

2. The filtration apparatus in accordance with claim 1 further comprising a bottom cover for protecting said cylindrical shaped vessel.

3. The filtration apparatus in accordance with claim 1 wherein said double filter assembly is made of stainless steel material.

4. The filtration apparatus in accordance with claim 1 wherein said mesh screens of said upper and lower filter units are a fine-mesh screen.

5. The filtration apparatus in accordance with claim 1 wherein said cylindrical shaped vessel is made of glass material.

6. The filtration apparatus in accordance with claim 1 wherein said cylindrical shaped vessel is made of ceramic material.

7. A filtration apparatus for brewing contents therein when hot water is added into the apparatus and allowing a user to directly drink a brewed liquid from the contents, the apparatus comprising:

a. a vessel having a bottom, an upwardly extending sidewall and an upper rim at the top of its sidewall, the sidewall having an interior surface and an exterior surface;

b. a lower filter unit having a bottom plate, a top plate, a mesh screen sandwiched between the top and bottom plates, and a compressible and expandable spring wrapped around the outer periphery of the top plate, the bottom plate having a hub and means for allowing the brewed liquid to pass therethrough, the retaining plate having an aperture and means for allowing the brewed liquid to pass therethrough, the mesh screen having an aperture and a periphery sidewall, the hub inserted through the apertures of the mesh screen and the top plate;

c. an upper filter unit having a mesh screen, a retaining plate, and a compressible and expandable spring sandwiched between the mesh screen and the retaining plate, the mesh screen having an aperture and a periphery sidewall, the retaining plate having an aperture and means for allowing the brewed liquid to pass therethrough;

d. an alignment rod having a lower retaining sleeve with a lower end and an upper retaining sleeve with an upper end, where the lower end is press-fitted into said hub of said bottom plate of said lower filter unit and the lower retaining sleeve abuts against said top plate of said lower filter unit for securing said top plate and said mesh screen to said bottom plate of said lower filter unit, and the upper end inserted through said apertures of said mesh screen and said retaining plate of said upper filter unit and retained thereto by a nut means such that the upper retaining sleeve abuts against said mesh screen of said upper filter unit and the nut means abuts against said retaining plate of said upper filter unit; and e. said lower and upper filter units inserted into said vessel and respectively located adjacent to the lowermost and uppermost portions of said vessel, where said periphery sidewalls of said mesh screens of said lower and upper filter units engage with said interior surface of said sidewall of said vessel and said compressible and expandable springs expand against said periphery sidewalls of said mesh screens to engage with said interior surface of said sidewall of said vessel for preventing said contents from escaping therebetween;

f. whereby said contents is brewed within said vessel and said lower and upper filter units provide double protection to prevent said contents from being consumed by said user.

8. The filtration apparatus in accordance with claim 7 further comprising a handle member affixed to said exterior surface of said sidewall of said vessel.

9. The filtration apparatus in accordance with claim 7 further comprising a bottom cover for protecting said vessel.

10. The filtration apparatus in accordance with claim 7 wherein said upper and lower filter units are made of stainless steel material.

11. The filtration apparatus in accordance with claim 7 wherein said mesh screens of said upper and lower filter units are a fine-mesh screen.

12. The filtration apparatus in accordance with claim 7 wherein said vessel is made of glass material.

13. The filtration apparatus in accordance with claim 7 wherein said vessel is made of ceramic material.

14. The filtration apparatus in accordance with claim 7 wherein said means for allowing the brewed liquid to pass through said top and bottom plates of said lower filter unit includes at least one opening.

15. The filtration apparatus in accordance with claim 7 wherein said means for allowing the brewed liquid to pass through said retaining plate of said upper filter unit includes at least one opening.

16. A filtration apparatus for brewing contents therein when hot water is added thereto and allowing a user to directly drink a brewed liquid from the apparatus, the apparatus comprising:

a. a container having an upper lip for allowing the user to directly drink from the container and an interior boundary;

b. a first filter means expanding against the interior boundary of said container and located adjacent to the lowermost portion of said container for trapping the contents in the lowermost portion of said container and preventing the contents in said container from being consumed by the user but allowing the brewed liquid to pass therethrough;

c. a second filter means expanding against the interior boundary of said container and located remote from said first filter means and adjacent to the uppermost portion of said container for further trapping the contents in said container between the first and second filter means and preventing said contents from being consumed by said user but allowing the brewed liquid to pass therethrough;

d. the distance between said first filter means and said second filter means being at least two-thirds of the height of the container; and e. means for maintaining the alignment and spaced apart relationship of said first and second filter means in said container;

f. whereby when brewing of the contents is completed, the brewed liquid can be consumed by said user using the same container, where the brewed liquid passes through said first and second filter means but said contents are retained in said container by said first and second filter means.

17. The apparatus in accordance with claim 16 wherein said first and second filter means are a fine mesh screen.

18. The apparatus in accordance with claim 16 wherein said first and second filter means are made out of stainless steel material.

19. The apparatus in accordance with claim 16 wherein said means for maintaining the alignment and spaced apart relationship of said first and second filter means in said container include an elongated rod connecting said first and second filter means.

20. A filtration apparatus for brewing contents therein when hot water is added into the apparatus and allowing a user to directly drink a brewed liquid therefrom, the apparatus comprising:

a. a generally cylindrical shaped vessel having a bottom, an upwardly extending circumferential sidewall and an upper rim at the top of its circumferential sidewall, the circumferential sidewall having an interior surface and an exterior surface;

b. a handle member affixed to said exterior surface of said circumferential sidewall of said cylindrical shaped vessel;

c. a lower filter unit having a support plate, a retaining plate, a flexible mesh screen sandwiched between the support and retaining plates, and a circular shaped coil spring wrapped around the outer periphery of the retaining plate, the support plate having a central upwardly protruding hub with inner threads, the support plate also having at least one open section for allowing the brewed liquid to pass through, the retaining plate having a central aperture and a plurality of small apertures surrounding the central aperture for allowing the brewed liquid to pass through, the flexible mesh screen having a central aperture and an outer periphery sidewall extending upwardly, the upwardly protruding hub inserted through the central apertures of the flexible mesh screen and the retaining plate;

d. a lid having a hemispherical body portion and a circumferential disk surrounding the hemispherical body portion, the circumferential disk having at least one cut away portion to facilitate liquid passing through the circumferential disk, the hemispherical body portion having a recessed top surface forming a well, a bottom surface and a protruding hub integrally connected to the bottom surface, the lid also having a handle disposed within the well for lifting the lid;

e. an elongated vertical alignment rod having an upper portion with an upper end, and a lower portion with a lower end and outer screw threads;

f. a lower cylindrical sleeve having inner screw threads threadedly engaging said outer screw threads on said lower portion of said vertical alignment rod;

g. said lower end of said vertical alignment rod inserted into said central protruding hub of said support plate of said lower filter unit such that said outer screw threads thereof are further threadedly engaged with said inner screw threads of said protruding hub, where said lower cylindrical sleeve abuts against said retaining plate of said lower filter unit for securing said retaining plate and said mesh screen to said support plate;

h. said upper end of said vertical alignment rod press-fitted within said protruding hub of said hemispherical portion of said lid; and i. said lower filter unit and said lid inserted into said cylindrical shaped vessel and respectively located adjacent to the lowermost and uppermost portions of said cylindrical shaped vessel, where said outer periphery sidewall of said mesh screen of said lower filter unit engages with said interior surface of said circumferential sidewall of said cylindrical shaped vessel and said coil spring expands against said outer periphery sidewall of said mesh screen to engage with said interior surface of said sidewall of said cylindrical shaped vessel for tapping the contents at the lowermost portion of said vessel, and said lid located adjacent to said upper rim of said vessel and abuts against said interior surface of said sidewall of said vessel for retaining heat within said vessel from said brewed liquid to maintain said brewed liquid hot;

j. whereby said contents is brewed within said vessel, said lower filter unit prevents said contents from being consumed by said user, and said lid prevents said brewed liquid from splashing while allowing said user to drink said brewed liquid through said at least one gap on said disk of said lid.

21. The filtration apparatus in accordance with claim 20 further comprising a bottom cover for protecting said cylindrical shaped vessel.

22. The filtration apparatus in accordance with claim 20 wherein said lower filter unit is made of stainless steel material.

23. The filtration apparatus in accordance with claim 20 wherein said mesh screen is a fine-mesh screen.

24. The filtration apparatus in accordance with claim 20 wherein said cylindrical shaped vessel is made of glass material.

25. The filtration apparatus in accordance with claim 20 wherein said cylindrical shaped vessel is made of ceramic material.

26. A filtration apparatus for brewing contents therein when hot water is added into the apparatus and allowing a user to directly drink a brewed liquid therefrom, the apparatus comprising:

a. a vessel having a bottom, an upwardly extending sidewall, and an upper rim at the top of its sidewall, the sidewall having an interior surface and an exterior surface;

b. a filter unit having a bottom plate, a top plate, a mesh screen sandwiched between the top and bottom plates, and a compressible and expandable spring wrapped around the outer periphery of the top plate, the bottom plate having a hub and means for allowing the brewed liquid to pass therethrough, the top plate having an aperture and means for allowing the brewed liquid to pass therethrough, the mesh screen having an aperture and a periphery sidewall, the hub inserted through the apertures of the mesh screen and the top plate;

c. a lid having a body portion and a disk surrounding the body portion, the disk having at least one cut away portion to facilitate liquid passing through the circumferential disk, the body portion having a recessed top surface forming a well, a bottom surface and a protruding hub connected to the bottom surface;

d. an alignment rod having an upper portion with an upper end and a lower portion with a lower end, where the lower end is press-fitted into said hub of said bottom plate of said filter unit, and the upper end is press-fitted into said protruding hub of said lid; and e. said filter unit and said lid respectively located adjacent to the lowermost and uppermost portions of said vessel, where said periphery sidewall of said mesh screen engages with said interior surface of said sidewall of said vessel and said compressible and expandable spring expands against said periphery sidewall of said mesh screen to engage with said interior surface of said sidewall of said vessel for trapping the contents at the lowermost portion of said vessel, and said disk of said lid located adjacent to said upper rim of said vessel and abuts against said interior surface of said sidewall of said vessel for retaining heat within said vessel from said brewed liquid to maintain said brewed liquid hot;

f. whereby said contents is brewed within said vessel, said filter unit prevents said contents from being consumed by said user, and said lid prevents said brewed liquid from splashing while allowing said user to drink said brewed liquid through said at least one gap on said disk of said lid.

27. The filtration apparatus in accordance with claim 26 wherein said lid further comprising a handle disposed within said well for lifting said lid.

28. The filtration apparatus in accordance with claim 26 further comprising a handle member affixed to said exterior surface of said sidewall of said vessel.

29. The filtration apparatus in accordance with claim 26 further comprising a bottom cover for protecting said vessel.

30. The filtration apparatus in accordance with claim 26 wherein said filter unit is made of stainless steel material.

31. The filtration apparatus in accordance with claim 26 wherein said mesh screen of is a fine-mesh screen.

32. The filtration apparatus in accordance with claim 26 wherein said vessel is made of glass material.

33. The filtration apparatus in accordance with claim 26 wherein said vessel is made of ceramic material.

34. The filtration apparatus in accordance with claim 26 wherein said means for allowing the brewed liquid to pass through said top and bottom plates of said filter unit includes at least one opening.

* * * * *